US011030994B2

(12) United States Patent
Ji et al.

(10) Patent No.: US 11,030,994 B2
(45) Date of Patent: Jun. 8, 2021

(54) SELECTIVE ACTIVATION OF SMALLER RESOURCE FOOTPRINT AUTOMATIC SPEECH RECOGNITION ENGINES BY PREDICTING A DOMAIN TOPIC BASED ON A TIME SINCE A PREVIOUS COMMUNICATION

(71) Applicant: MOTOROLA MOBILITY LLC, Chicago, IL (US)

(72) Inventors: Zhengping Ji, Hinsdale, IL (US); Leo S. Woiceshyn, Chicago, IL (US); Karthik Mohan Kumar, Chicago, IL (US); Yi Wu, Chicago, IL (US); Thomas Y. Merrell, St Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 79 days.

(21) Appl. No.: 16/393,720

(22) Filed: Apr. 24, 2019

(65) Prior Publication Data

US 2020/0342853 A1     Oct. 29, 2020

(51) Int. Cl.
*G10L 15/02* (2006.01)
*G10L 15/20* (2006.01)
*G10L 15/065* (2013.01)

(52) U.S. Cl.
CPC ............ *G10L 15/02* (2013.01); *G10L 15/065* (2013.01); *G10L 15/20* (2013.01)

(58) Field of Classification Search
CPC ........ G10L 15/02; G10L 15/065; G10L 15/20
See application file for complete search history.

(56) References Cited

U.S. PATENT DOCUMENTS

| 9,760,566 B2* | 9/2017 | Heck ................... G06F 40/35 |
| 9,799,049 B2* | 10/2017 | Balasubramanian ....................... G06Q 30/0255 |
| 2016/0284349 A1* | 9/2016 | Ravindran ............. G10L 15/20 |
| 2020/0020326 A1* | 1/2020 | Srinivasan .......... G10L 15/1815 |

* cited by examiner

*Primary Examiner* — Stella L. Woo
(74) *Attorney, Agent, or Firm* — Isidore PLLC

(57) ABSTRACT

A method and data processing device for detecting a communication between a first and second entity. The method includes identifying whether a previous communication between the first and second entity has been detected. In response to identifying that the previous communication between the first and second entity has been detected, the method determines an elapsed time since detection of the previous communication. The method predicts a topic of the communication, in part based on the determined elapsed time. The topic corresponds to a specific domain from among a plurality of available domains for automatic speech recognition (ASR) processing. The method triggers selection and activation of a first domain specific (DS) ASR engine from among a plurality of available DS ASR engines to utilize a smaller resource footprint than a general ASR engine and facilitate recognition of specific vocabulary and context, in part, based on the elapsed time since the previous communication.

20 Claims, 8 Drawing Sheets

FIG. 4

COMMUNICATION TRACKING DATABASE 252

| COMMUNICATION IDENTIFIER 404 | FIRST ENTITY 406 | SECOND ENTITY 408 | TOPIC(S) OF COMM. 410 | TIME OF DAY 412 | ELAPSED TIME 414 | PREDICTED DS-ASR ENGINE 416 | PREDICTION METRIC 418 |
|---|---|---|---|---|---|---|---|
| IDENTIFIER_1 | RUTH | FRED | BREAKFAST/ KIDS | 8:00 AM/ 8/01/19 7:57 AM/ 8/08/19 | 9 HRS | GREETINGS/ FOOD/SPORTS | 98% |
| | | | BREAKFAST/ KIDS | 8:00 AM/ 8/02/19 8:00 AM/ 8/09/19 | 10 HRS | GREETINGS/ FOOD/ INSTRUMENTS | 97% |
| | | | BREAKFAST/ KIDS | 7:58 AM/ 8/03/19 7:59 AM/ 8/10/19 | 8 HRS | GREETINGS/ FOOD/SPORTS | 99% |
| IDENTIFIER_2 | RUTH | MARY | LAB, EXPERIMENTS, QUANTUM PHYSICS | 10:00 AM | 18 HRS | SCIENCE | 87% |
| IDENTIFIER_3 | RUTH | KIM | LUNCH | 12:00 PM | 24 HRS | RESTAURANTS | 90% |
| ... | ... | ... | ... | ... | ... | ... | |
| IDENTIFIER_N-1 | RUTH | FRED | WORK, STORE | 6:00 PM | 8 HRS | SCIENCE, FOOD | 94% |
| IDENTIFIER_N | RUTH | FRED | DINNER, SOCCER | 6:00 PM | 30 MINS | RECIPES SPORTS | 89% |

SELECTIVE ACTIVATION OF SMALLER RESOURCE FOOTPRINT AUTOMATIC SPEECH RECOGNITION ENGINES BY PREDICTING A DOMAIN TOPIC BASED ON A TIME SINCE A PREVIOUS COMMUNICATION

BACKGROUND

1. Technical Field

The present disclosure generally relates to communication devices that provide automatic speech recognition and in particular to a method for saving power during automatic speech recognition utilized by communication devices.

2. Description of the Related Art

Automatic speech recognition (ASR) enables the recognition and translation of spoken language into text by computers or mobile devices. ASR utilizes a voice user interface to communicate with a computing device. Voice user interfaces associated with mainstream use of ASR are typically included in speakers, smart TVs, and other ASR equipped devices.

Most of the existing ASR is based on a cloud solution, where the translated speech data is sent to the cloud infrastructure to get processed by a cloud-based processing system with large processing capacity. The use of ASR in devices which have much smaller processing resources remains a challenge due to computational complexities of the ASR and limited processing and power capabilities of the device.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4 illustrates an example communication tracking database for use by the communication processing system of FIG. 3, according to one or more embodiments;

DETAILED DESCRIPTION

Figure 1:
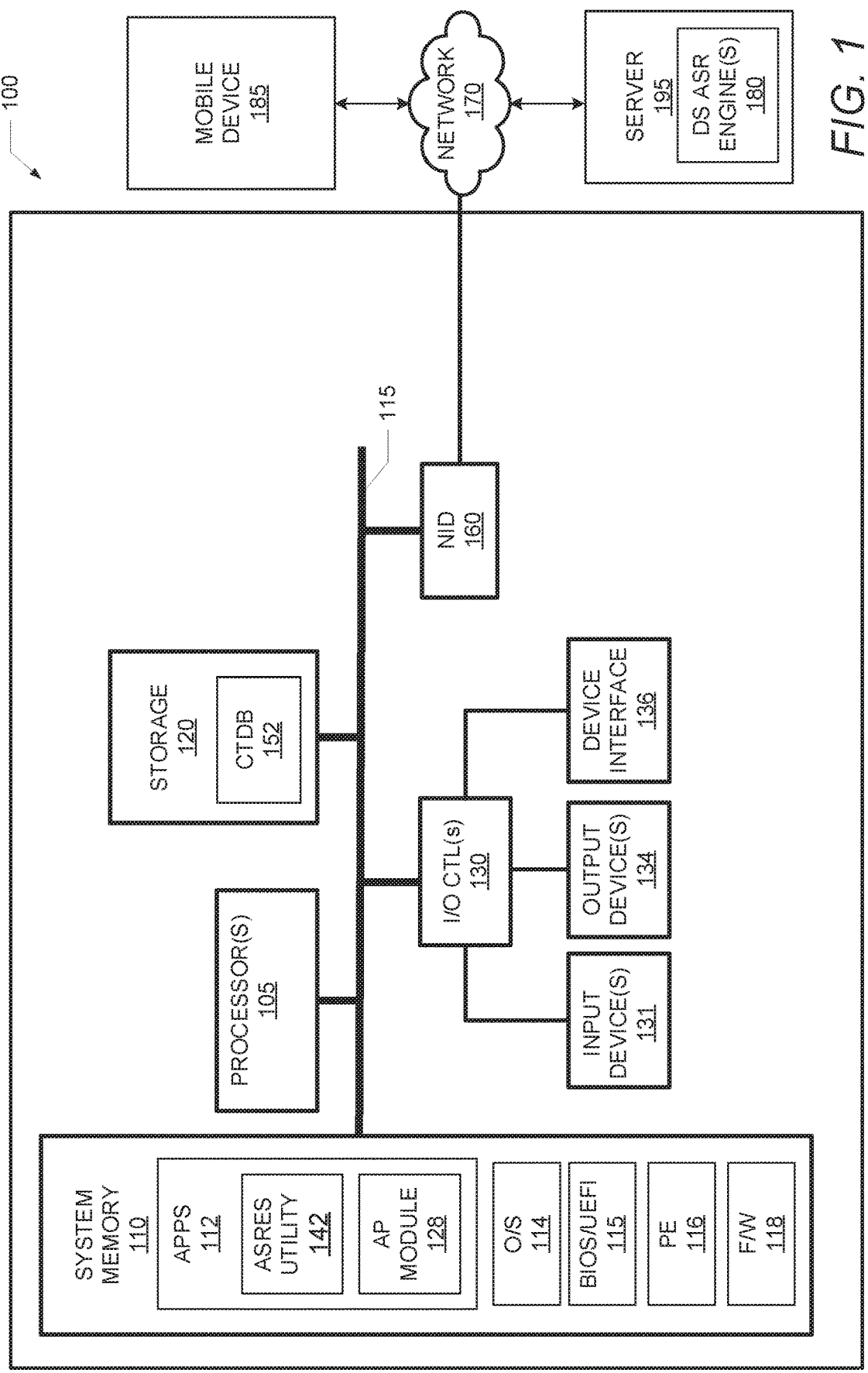
FIG. 1 provides a block diagram representation of an example data processing system within which certain aspects of the disclosure can be practiced, in accordance with one or more embodiments.

Disclosed are a method, a data processing device, and a computer program product for predicting a topic of a communication between two entities and for selective activation of specific domain-specific automatic speech recognition engines, based on a domain prediction that is in part based on an elapsed time since a previous communication between two entities. The method includes detecting, at an electronic device, a communication between a first entity and a second entity. The method includes identifying whether a previous communication between the first entity and the second entity has been detected at the electronic device. In response to identifying that the previous communication between the first entity and the second entity has been detected at the electronic device, the method includes: (i) determining an elapsed time since detection of the previous communication; (ii) predicting a topic of the communication, in part based on the determined elapsed time since the previous communication, the topic corresponding to a specific domain from among a plurality of available domains for automatic speech recognition (ASR) processing; and (iii) triggering selection and activation, on the electronic device, of a first domain-specific (DS) ASR engine from among a plurality of available DS ASR engines. The first DS ASR engine selected utilizes a smaller resource footprint than a general ASR engine and facilitates recognition of specific vocabulary and context associated with the topic that was predicted, in part, based on the elapsed time since the previous communication.

According to one embodiment, a data processing device comprises a communication receiving device that detects communication, a storage device, and a processor. The processor is communicatively coupled to the communication receiving device and the storage device. The processor executes an ASR engine selection (ASRES) utility, which configures the data processing device to detect, at an electronic device, a communication between a first entity and a second entity. The processor identifies whether a previous communication between the first entity and the second entity has been detected at the electronic device. In response to identifying that the previous communication between the first entity and the second entity has been detected at the electronic device, the processor: (i) determines an elapsed time since detection of the previous communication; (ii) predicts a topic of the communication, in part based on the determined elapsed time since the previous communication, the topic corresponding to a specific domain from among a plurality of available domains for automatic speech recognition (ASR) processing; and (iii) triggers selection and activation, on the electronic device, of a first domain specific (DS) ASR engine from among a plurality of available DS ASR engines. The first DS ASR engine selected utilizes a smaller resource footprint than a general ASR engine and facilitates recognition of specific vocabulary and context associated with the topic that was predicted, in part, based on the elapsed time since the previous communication.

According to another embodiment, a computer program product includes a computer readable storage device and program code on the computer readable storage device. When executed by a processor associated with a device, the program code enables the device to provide the various functionality presented in the above-described method processes.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 illustrates a block diagram representation of a data processing device, referenced herein as data processing system (DPS) 100, and within which one or more of the described features of the various embodiments of the disclosure can be implemented. Data processing system 100 may, for example, be a handheld device, a personal computer, such as a laptop, tablet, or desktop computer, a server, a network storage device, or any other suitable device and may vary in size, shape, performance, functionality, and price.

Referring specifically to FIG. 1, example DPS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). Stored within storage 120 is communication tracking database (CTDB) 152. In one alternate embodiment, CTDB 152 is a database that is remote to mobile device 185. CTDB 152 can be utilized to minimize storing predictive assessments that enable processor 105 to predict a topic of a future/subsequent communication and selectively activate automatic speech recognition resources of mobile device 185, based on the predicted topic.

Storage 120 can be a hard drive or a solid-state drive. The one or more software and/or firmware modules within storage 120 can be loaded into system memory 110 during operation of DPS 100. As shown, system memory 110 can include therein a plurality of software and/or firmware modules including application(s) 112, operating system (O/S) 114, basic input/output system/unified extensible firmware interface (BIOS/UEFI) 115, prediction engine (PE) 116, ASR engine selection (ASRES) utility 142, and other firmware (F/W) 118. While presented as two separate components, in one or more embodiments, PE 116 is an executable module within ASRES utility 142. PE 116 provides the functionality of predicting a topic of with a detected communication, where the prediction is in part based on the elapsed time since a previous communication between the same communicating entities. In one embodiment, PE 116 provides an algorithm that selects from among multiple possible domain topics (i.e., topics that correspond to specific domains) using various contexts and historical data, including the elapsed time since the most previous communication. PE 116 is an adaptive algorithm and includes a learning module that evaluates the accuracy of the prediction and updates the prediction, if required, based on measured metrics. ASR engine selection (ASRES) utility 142 selects and activates a corresponding DS ASR engine, based on the predicted topic and corresponding domain. The selected DS ASR engine requires less device resources and thus utilizes less power than a full ASR engine. The various software and/or firmware modules have varying functionality when their corresponding program code is executed by processor(s) 105 or other processing devices within DPS 100.

DPS 100 also includes audio processing (AP) module 128 and ASR engine selection (ASRES) utility 142. Audio processing (AP) module 128 is a software module within system memory 110 that is utilized to analyze and manipulate received audio data. ASRES utility 142 may be provided as an application that is optionally located within system memory 110 and executed by processor 105. For simplicity, ASRES utility 142 is illustrated and described as a stand-alone or separate software/firmware/logic component, which, when executed by processor, provides specific functions and methods described herein. However, in at least one embodiment, ASRES utility 142 may be a component of, may be combined with, or may be incorporated within OS 114, and/or with/within one or more applications 112.

DPS 100 further comprises a network interface device (NID) 160. NID 160 enables DPS 100 to communicate and/or interface via a communication network with other devices, services, and components located external (remote) to DPS 100. These devices, services, and components can interface with DPS 100 via an external network, such as example network 170, using one or more communication protocols. Network 170 can be a local area network, wide area network, personal area network, signal communication network, and the like. In one example, a wide area network is the Internet. Further, the connection to and/or between network 170 and DPS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network.

DPS 100 further includes one or more input/output (I/O) controllers 130, which support connection by, and processing of signals from, one or more connected input device(s) 131, such as a keyboard, mouse, touch screen, or microphone. I/O controllers 130 also support connection to and forwarding of output signals to one or more connected output devices 134, such as a display and audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be coupled to I/O controllers 130 or otherwise associated with DPS 100. Device interface(s) 136 can be utilized to enable data to be read from or stored to additional devices, for example, a compact disk (CD), digital video disk (DVD), flash drive, or flash memory card. In one or more embodiments, device interfaces 136 can further include General Purpose I/O interfaces, such as an Inter-Integrated Circuit (I²C) Bus, System Management Bus (SMBus), and peripheral component interconnect (PCI) buses.

In one or more embodiments, DPS 100 communicates with server 195. Server 195 can have similar component makeup and configuration to DPS 100. DPS 100 and mobile device 185 are connected to server 195 via network 170. Server 195 can include a remote AP module 128. In one or more embodiments, server 195 transmits data to and receives data from DPS 100 and a remote device such as mobile device 185. DPS 100 and mobile device 185 can utilize remote domain specific (DS) automatic speech recognition (ASR) engines 180 that are stored on server 195. DS ASR 180 can be selectively retrieved from a remote location such as, server 195, via network 170, and executed locally on DPS 100 and mobile device 185.

Figure 2:
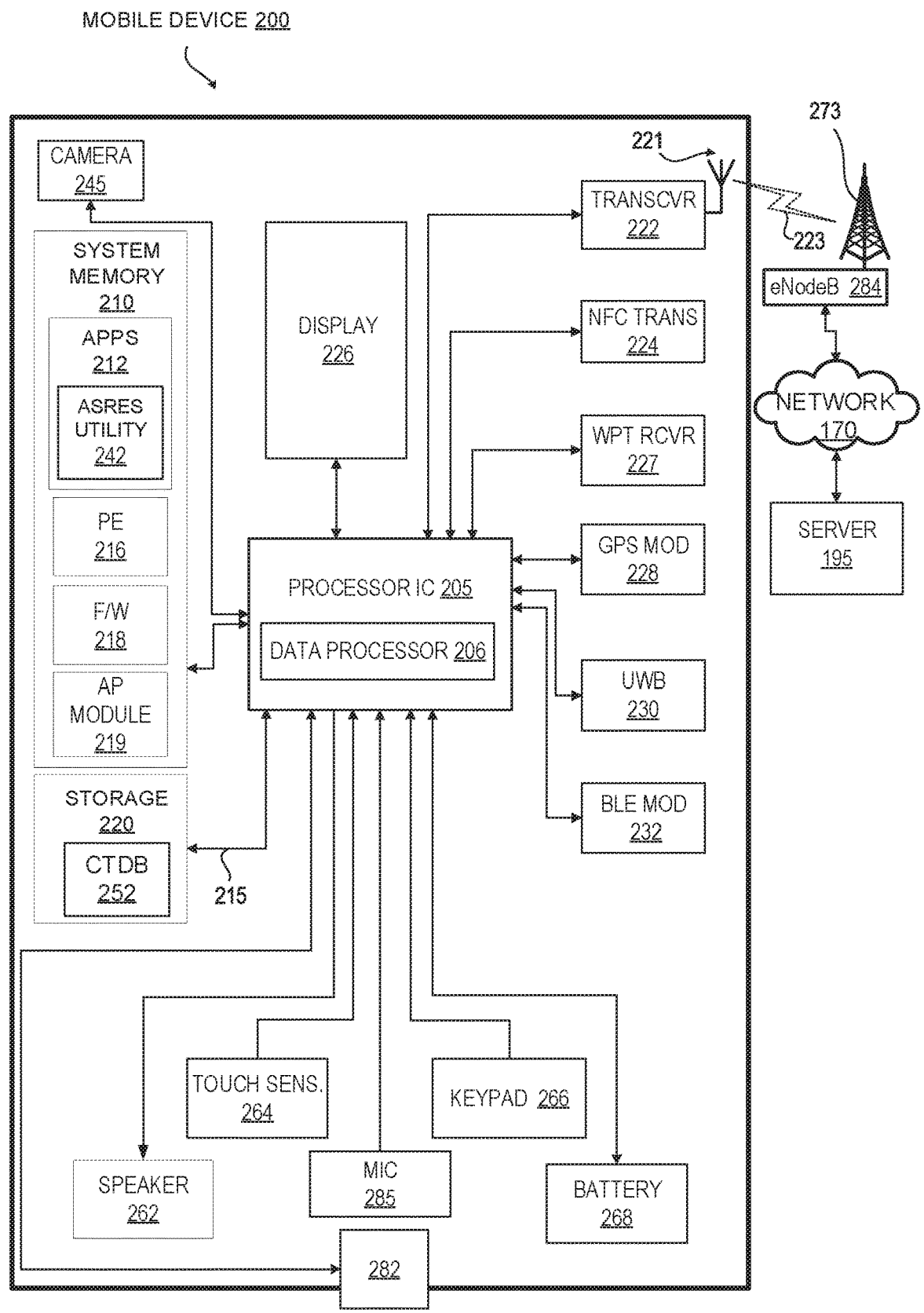
FIG. 2 illustrates a mobile device within which certain aspects of the disclosure can be practiced, in accordance with one or more embodiments.

In the description of the following figures, reference is also occasionally made to specific components illustrated within the preceding figures, utilizing the same or similar reference numbers from the earlier figures. With reference now to FIG. 2, there is illustrated an example mobile device 200, within which certain aspects of the disclosure can be practiced, in accordance with one or more embodiments. Mobile device 200 can be utilized as mobile device 185 in FIG. 1, which can have similar component makeup and configuration to mobile device 200. Mobile device 200 includes at least one processor integrated circuit (IC) 205. Processor IC 205 includes data processor 206. Processor IC 205 is referred to, in totality, herein as "processor" 205. Processor 205 is coupled to system memory 210 and non-volatile storage 220 via a system communication mechanism, such as system interconnect 215. Stored within storage 220 is communication tracking database (CTDB) 252. CTDB 252 is a database that is local to mobile device 200. CTDB 252 can be utilized to store predictive assessments that enable processor 105 to proactively load and execute automatic speech recognition resources. The ASR resources can be local or remote to mobile device 200. One or more software and/or firmware modules can be loaded into system memory 210 during operation of mobile device 200. Specifically, system memory 210 includes applications 212 and firmware (F/W) 218. In one embodiment, system memory 210 includes therein prediction engine 216 for proactively activating a select DS ASR engine, and audio processing (AP) module 219 for processing audio input. System memory 210 may also include basic input/output system and an operating system (not shown).

Processor 205 supports connection by and processing of signals from one or more connected input/output devices such as display 226, camera 245, speaker 262, touch sensor 264, keypad 266, and microphone 285, by executing modules and engines stored in system memory 210. Additionally, in one or more embodiments, one or more device interfaces 282, such as an optical reader, a universal serial bus (USB), a card reader, Personal Computer Memory Card International Association (PCMIA) slot, and/or a high-definition multimedia interface (HDMI), can be associated with mobile device 200. Mobile device 200 also contains a power source such as a battery 268 that supplies power to mobile device 200.

Mobile device 200 further includes antenna 221 connected to transceiver 222 to enable receiving and transmitting data when in communication with one or more base stations. Transceiver 222 allows for wide-area or local wireless communication, via wireless signal 223, communicated via antenna 273 between mobile device 200 and evolved node B (eNodeB) 284. Mobile device 200 is capable of wide-area or local wireless communication with other mobile wireless devices or with eNodeB 284 as a part of a wireless communication network. Mobile device 200 communicates with other mobile wireless devices by utilizing a communication path involving transceiver 222, antenna 221, wireless signal 223, antenna 273, and eNodeB 284.

In one embodiment, other devices within mobile device 200 utilize antenna 221 to send and/or receive signals in the form of radio waves. These devices include near field communication transceiver (NFC TRANS) 224, wireless power transfer receiver (WPT RCVR) 227, global positioning system module (GPS MOD) 228, ultra-wideband (UWB) transceiver 230, and Bluetooth Low Energy (BLE) module 232, all of which are communicatively coupled to processor 205. While presented as a single antenna, it is appreciated that multiple different antenna modules can be provided within mobile device 200 to support communication via the various different types of communication technology. For example, GPS MOD 228 communicatively couples to antenna 221 to receive location data. UWB transceiver 230 communicatively couples to antenna 221 and uses radio technology that can operate with very low energy levels to send and/or receive high-bandwidth communications within an approximated range. Further, BLE MOD 232 may connect to antenna 221, enabling mobile device 200 and/or components within mobile device 200 to communicate and/or interface with other devices, services, and components that are located external to mobile device 200 and use Bluetooth technology.

As provided by FIG. 2, mobile device 200 additionally includes ASRES utility 242 which, in one embodiment, executes on processor 205 to enable the processing of data received from AP module 219, GPS MOD 228, BLE MOD 232, and camera 245. In at least one embodiment, ASRES utility 242 may be a component of, may be combined with, or may be incorporated within one or more applications 212. Additional aspects of ASRES utility 242 and the functionalities thereof, are presented within the description of FIGS. 3-7. The software and/or firmware modules provide varying functionality when their corresponding program code is executed by processor 205 or by secondary processing devices within mobile device 200. For example, camera 245, GPS MOD 228, BLE MOD 232, and AP module 219 can contribute to location information and person identification during a communication as received by mobile device 200. In one embodiment, CTDB 252 is populated, in part, based on identification of a first and second person/entity, GPS location data, Bluetooth signals, and/or radio-frequency identification (RFID) signals during a communication.

Mobile device 200 is presented as a wireless communication device. As a wireless device, mobile device 200 can communicate data over network 170. For example, mobile device 200 transmits data to and/or receives data from remote CTDB 152 within DPS 100. In an alternate embodiment, a copy of CTDB 252 is also stored, or alternatively stored within a remote database. For example, a copy of CTDB 252 can be stored on server 195.

As will be discussed further, processor 205 provides data to and retrieves data from CTDB 252, within non-volatile storage 220. CTDB 252 and/or remote CTDB 152 may provide a common, unified or central database for the collection of person identification, time information, selected device resources, historical data specific to person identification, location information including specified coordinates and/or data points that are associated with response signals detected by transceiver 222, GPS MOD 228, BLE MOD 232, and camera 245. Mobile device 200 and components thereof are further discussed in FIG. 3.

Figure 3:
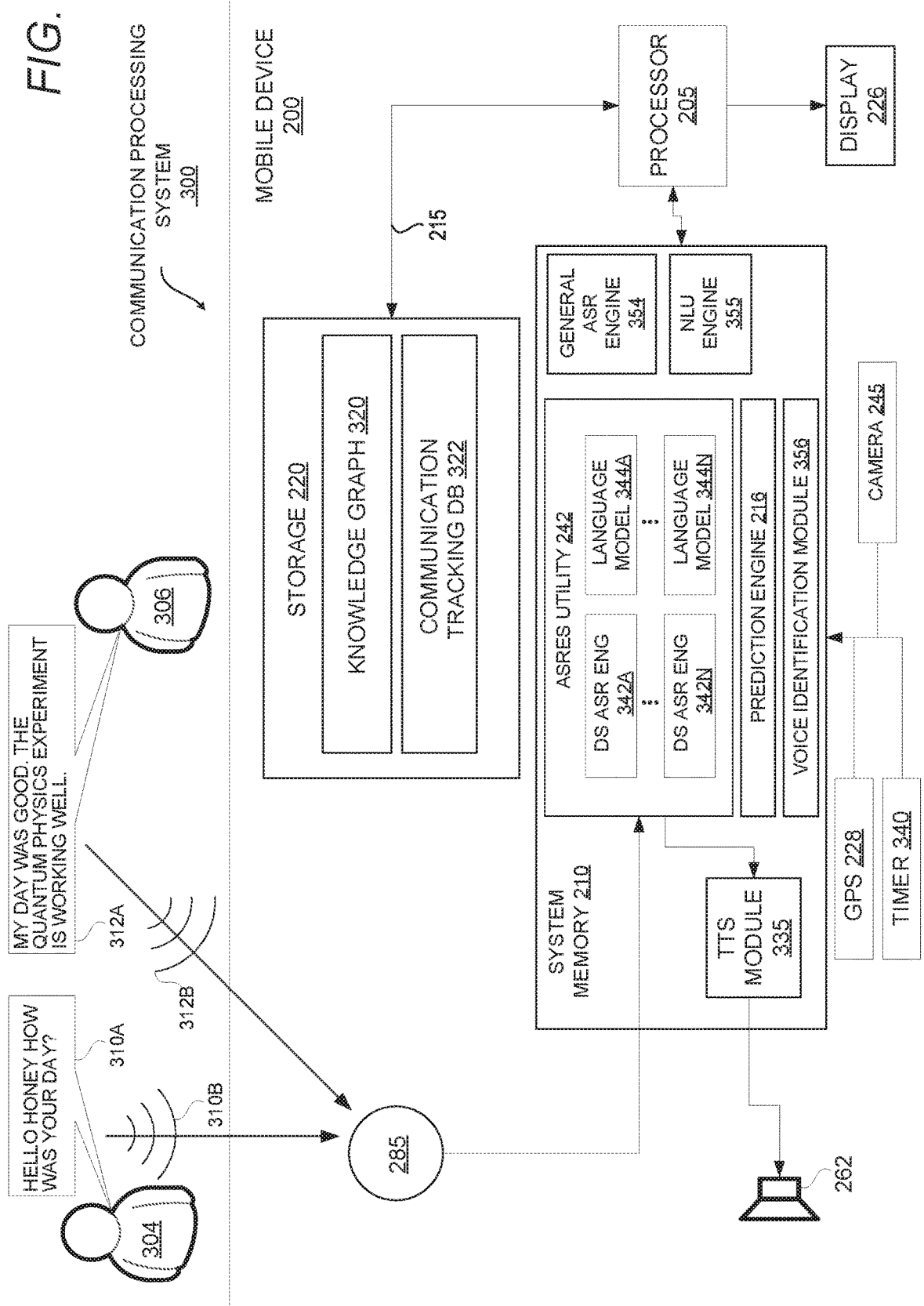
FIG. 3 illustrates a block diagram representation of a communication processing system/environment within which conversations detected in a vicinity of the mobile device of FIG. 2 are processed, in accordance with one or more embodiments.

With reference now to FIG. 3, there is illustrated a block diagram representation of a communication processing system/environment within which conversations detected in a vicinity of the mobile device of FIG. 2 are processed, in accordance with one or more embodiments. Communication processing system 300 generally includes mobile device 200 which passively listens as first entity 304 and second entity 306 generate speech 310A and 312A, respectively. The communication between first entity 304 and second entity 306, represented as speech 310A and 312A, is received at mobile device 200 as speech input 310B and 312B. Mobile device 200 includes processor 205, system memory 210, system interconnect 215, storage 220, display 226, speaker 262, GPS 228, timer 340, camera 245, and microphone 285.

System memory 210 of mobile device 200 includes voice identification module 356, text to sound (TTS) module 335, ASRES utility 242, prediction engine 216, general automatic speech recognition (ASR) engine 354 and natural language understanding (NLU) engine 355. Within ASRES utility 214 are domain specific (DS) automatic speech recognition (ASR) engines 342A-N, and language model A 344A-N. DS ASR engines 342A-N are sub-engines proactively triggered to correlate to topics associated with speech 310A and 312A. Each DS ASR utilizes less resources (e.g., operates using less processor, memory, and/or power resources) and thus has a smaller resource footprint than a general ASR. Each DS ASR can thus be interchangeably referred to as a smaller resource footprint ASR when compared to a general ASR. ASRES utility 242 enables processor 205 to execute the functionalities of prediction engine 216 and corresponding DS ASR engines 342A-342N. Further storage 220 includes knowledge graph 320 and communication tracking database 322.

In operation, utilizing the instructions of ASRES utility 242, processor 205 enables mobile device 200 to selectively activate specific DS ASRs. Processor 205 executes voice identification module 356 to detect a communication between first entity 304 and second entity 306. Voice identification module 356 identifies first and second entity 304 and 306 associated with the communication. In one embodiment first and second entity 304 and 306 are humans, for example a first person communicating with a second person. In another embodiment, first entity 304 is a person and second entity 306 is an animal. In still another embodiment first entity 304 is a person and second entity 306 is a sound producing object. Each communication between the same two first and second entities is provided with a same communication identifier (ID) and tracked within CTDB 252. For each communication received, processor 205 records a time of the communication and determines an elapsed time since a previous communication between the same two entities. Determining the elapsed time includes identifying a time of day that the communication between first entity 304 and second entity 306 is detected and comparing that time with a most previously recorded communication between the two entities within the CTDB 252. Processor 205 records, as historical data within communication tracking database 322, the time of day of the communication, as well as a plurality of other contexts detected/identified at the time of (or during) the communication. Processor 205 compares the time of day with a most recent previously-recorded time of day for a previous communication between first entity 304 and second entity 306, if a previous communication exists. If a previous communication between first entity 304 and second entity 306 exists, processor 205 identifies, from historical data, when the time of day of the communication is proximate to a stored time of day for at least one previous communication.

Further, in response to identifying that the previous communication between first entity 304 and second entity 306 has been detected at mobile device 200, processor 205 predicts the topic of the communication. By executing prediction engine 216 of ASRES utility 242, processor 205 predicts the topic in part based on the determined elapsed time since the previous communication. The topic corresponds to a specific domain from among a plurality of available domains for automatic speech recognition (ASR) processing, for example, DS ASR engines 342A-N and corresponding language models 344A-N. At least one of general ASR engine 354 and DS ASR engines 342A-N provide speech to text functionality. Processor 205 triggers selection and activation of a first DS ASR engine, DS ASR engine 342A, from among a plurality of available DS ASR engines 342A-N. DS ASR engine 342A is selected to utilize a smaller resource footprint than a general ASR engine, for example general ASR engine 354. DS ASR engine 342A facilitates recognition of specific vocabulary and context associated with the topic that was predicted. Processor 205 triggers and activates DS ASR engine 342A, in part, based on the elapsed time since the previous communication.

In one example, first entity 304 is a person who comes home from work each day at approximately six o'clock in the evening (i.e., 6 PM). First entity 304 habitually speaks the phrases "hello", "how was your day?", and "what should we get for dinner?". Second entity 306 habitually responds to the series of questions with a greeting, positive adjective, a brief summary of their scientific work, and a restaurant suggestion. Proactively, around 6 PM, at the onset of the habitual conversation, and/or based on GPS 228 location tracking indicating that the first entity has arrived home, processor 205 triggers selection and activation of one or more DS ASR engines 342A-N. DS ASR engines 342A-N have, for example, vocabulary terms that correlate to a greeting response, positive adjectives, and science. Further, in one embodiment, processor 205 executes a device resource that generates restaurant suggestions to display 226. In still another example, second entity 306 leaves the communication and/or location for 30 minutes. In response to detecting the communication between first entity 304 and second entity 306 is restarted (or that a next communication between the two entities begins), processor 205 triggers selection and activation of a next topic DS ASR engine from among the plurality of DS ASR engines within prediction engine 216, in part based on the elapsed time since the previous communication. The next topic DS ASR engine is predicted based on the elapsed time since the first communication and historical data of a pattern of communication between the two entities.

In one embodiment, multiple additional contexts can influence prediction of a topic of communication between first entity 304 and second entity 306. Processor 205 predicts the topic of the communication in part based on at least one other context from among a plurality of other contexts. The other contexts influence which topic from among multiple possible topics is predicted by a prediction algorithm of the electronic device. The plurality of other contexts can include a location at which the communication takes place. The location may be at least one of (i) a location of mobile device 200, and (ii) a location of one or both of first entity 304 and second entity 306. The location can be identified based on signals provided by GPS 228, BLE module 232, transceiver 222, and camera 245. Further, other contexts include identification of a habitual sequence of topics covered in communications between first entity 304 and second entity 306. Other contexts include a time of day of at least one of the communication and the previous communication. Further, other contexts can include identification of one or more characteristics of a relationship between each party to the communication. Identification of one or more characteristics of a relationship between first entity 304 and second entity 306 enables processor 205 to selectively trigger activation of one or more DS ASR engines 342A-N and/or language models 344A-N that correspond to the relationship. For example, in response to first entity 304 being an employee and second entity 306 being an employer, processor 205 will execute a first type of DS ASR engine (DS ASR 342A). In response to first entity 304 being a husband and second entity 306 being a wife, processor 205 will execute a second type of DS ASR engine (342N).

Another context that can be utilized is known acoustic characteristics used by first entity 304 and second entity 306 during prior communications with each other. In response to identifying, from the historical data, a DS ASR engine was activated during a previous communication, processor 205 selectively activates (based on a prediction that the communications involve the same topic) the same DS ASR engine when a communication between first entity 304 and second entity 306 is received. Historical data on how first entity 304 and second entity 306 relate to themes routinely seen in prior communications between first entity 304 and second entity 306 is another context that can be utilized from among the plurality of contexts. Another context can be, for instance, a manner in which at least one of first entity 304 and second entity 306 communicates about specific domains. Further, another context can include detection of common background noise(s) heard routinely when the first entity and the second entity are communicating at specific times of day. For instance, in response to hearing pots and pans in the background for a communication between first entity 304 and second entity 306, processor 205 activates a specific DS ASR engine. Processor activates one or more of DS ASR engines 342A-N that correlates to the communication based on the time of day, the communicators, the communication, and the background noise of the pots and pans. In one example, a frequency signal corresponding to the clinging of pots and pans is linked to the preparation of fried foods. Therefore, processor 205, utilizing ASRES utility 242, activates a DS ASR engine particular to fried foods. One or more other DS ASR engines can be deactivated. Still, another context can include detection, during the communication, of sounds commonly associated with specific historical contexts. Processor 205 can weigh the influence of each context independently or consider one or more contexts concurrently.

In one embodiment, ASRES utility 242 executes on processor 205 to track and collect historical data associated with a performance of the first DS ASR engine (342A) in accurately performing recognition of content of the communication. Processor 205 updates a prediction engine, based on the collected historical data, to more accurately trigger future predictions of which topic a future communication relates. Processor 205 accordingly activates a DS ASR engine (342A) corresponding to the predicted domain topic. The update can be based, in part, on an elapsed time since a prior communication between the first entity and the second entity and the collected historical data.

In one embodiment, the communication and previous communication occur within a communication sequence covering at least two different topics that typically occur between first entity 304 and second entity 306 beginning at a specific time of day. Each different topic has an associated DS ASR engine associated therewith. Processor 205 retrieves, from communication tracking database 322, historical data identifying a transition time between each of the at least two different topics. Predicting a start time of each topic within the communication sequence, processor 205 selects a first DS ASR (342A), in part based on the determined elapsed time since a previous topic and in part based on the historical data. Processor triggers selection and activation of a second DS ASR engine (342N) that corresponds to a next topic among the at least two different topics. Processor 205 activates the second DS ASR engine (342N) concurrently with a start of communication about the next topic. Accordingly, processor 205 de-activates DS ASR engine 342A associated with the previous topic from among a communication sequence of the at least two different topics. DS ASR engine 342A is deactivated at a corresponding transition time to the next topic in the communication sequence.

FIG. 4 illustrates an example CTDB 252 for use by the communication processing system of FIG. 3, according to one or more embodiments. CTDB 252 includes the following fields: communication identifier (ID) 404, first entity 406, second entity 408, topics of communication 410, time of day 412, elapsed time 414, predicted DS ASR engine 416, and prediction metric 418. For each first entity 406 and second entity 408 combination, CTDB 252 assigns and tracks a corresponding communication ID. Example communication IDs include ID 420, 422, 424, 426, and 428. For simplicity, each communication is illustrated as occurring between two entities, e.g., first entity 406 and second entity 408. In one or more embodiments, an identified communication can also be between two or more entities. In one or more embodiments, processor 205 determines an identification of the entity based on data retrieved by voice identification module 356, as well as information and/or signals collected, for example, by transceiver 222, GPS MOD 228, BLE MOD 232, camera 245

In one embodiment, processor 205 detects a communication between first entity 406 and second entity 408 and checks for a communication ID previously assigned to the pairing of the same two entities. In response to not identifying any previous communication between first entity 406 and second entity 408, ASRES utility 242 enables processor 205 to assign a first ID to the communication, for example, ID 420. ID 420 identifies that the communication is between first entity 406 and second entity 408. Processor 205 generates an entry within CTDB 252, tagged with the ID, and processor 205 records the communication ID, an identification of the first entity and of the second entity, and a time of day of the communication within the corresponding fields for the entry within CTDB 252. In one example, the time of day is stored as ante meridiem (AM) or post meridiem (PM), while in another example, a 24-hour clock time (e.g., military time) may be utilized. Along with time of day 412, processor 205 stores historical data corresponding to the communication. The historical data can include, but is not limited to including: (i) an identification of first entity 406 and second entity 408, (ii) the time of the communication (412), (iii) elapsed time (414) since a previous communication between the same two entities (e.g., at a different time of day, such as earlier in the same day or at the same time of day on a previous day) (414), (iv) the stored and/or predicted topic of communication (410), and (v) predicted DS ASR engine 416. Processor 205 tags the respective historical data with the respective ID and stores the correlating information as an entry in CTDB 252.

In one embodiment, in response to detecting the subsequent communication between first entity 406 and second entity 408 at substantially a same time of a different day as the time of the communication, processor 205 retrieves historical data of the communication from CTDB 252. Further, processor 205 predicts the topic of, and a corresponding DS ASR engine to activate for, the subsequent communication, in part based on the time of day of the subsequent communication, the historical data of the communication, and predictive metrics 418 related to an accuracy of the prediction of the first topic and activation of an associated first DS ASR engine. Predictive metrics 418 can be a percentage or a value that helps identify if a selected DS ASR engine correlates to the communication. In response to processor 205 proactively activating a DS ASR engine that detects the speech in the communication, processor 205 increases the prediction value (418) for the respective ID. Accurate detection of the speech is based on a predetermined threshold of words matching during the automatic speech recognition by the selected DS ASR engine. In one example, less than the threshold number of terms/words match during automatic speech recognition. Therefore, the prediction engine deduces that the selected DS ASR does not correlate to the communication between first entity 406 and second entity 408. Consequently, processor 205 selects a general ASR engine, such as general ASR engine 354, that includes a larger volume of grammatical phrases and/or words but requires higher processing and power capabilities. In response to general ASR engine 354 being triggered, processor 205 lowers prediction metric 418. It is appreciated that prediction engine continues to track the accuracy of the translations and make additional predictions for subsequent topics in order to more accurately align the communication with a DS ASR engine that has a higher level of correlation (i.e., more accurate matching) with the detected communication at the particular time.

In one embodiment, processor 205 detects a subsequent communication between first entity 406 and second entity 408 occurring at another, different time of day. Processor 205 retrieves the historical data for at least one most previous communication tagged with a same first ID from CTDB 252. ASRES utility 242 enables processor 205 to perform a prediction of a second topic of the subsequent communication. The prediction is in part based on the elapsed time since the at least one most previous communication and based on at least one other context. Processor 205 updates CTDB 252 to include second historical data associated with the subsequent communication occurring at the other time of day. The second historical data comprising a timestamp of the other, different time of day and detected prediction metrics 418 related to the prediction of the second topic. For example, ID 420 includes a specified time and date in the field of time of day 412 for two detected topics of discussion, "breakfast and kids" on multiple different days. Processor 205 advantageously stores various combinations of historical data within CTDB 252 to precisely tune triggering and activation of the more precise DS ASR engine and/or device resource.

In another embodiment, processor 205 retrieves, from communication tracking database, historical data identifying a transition time between each of the at least two different topics. Processor 205 predicts a start time of each topic within the communication sequence, in part based on the determined elapsed time since a previous topic and in part based on the historical data retrieved from CTDB 252. Processor 205 triggers selection and activation, on mobile device 200, of a second DS ASR engine. The second DS ASR engine corresponds to a next topic among the at least two different topics. The activation of the second DS ASR engine occurs concurrently with a start of communication about the next topic. When first entity 406 and second entity 408 are generating a communication sequence of at least two different topics, processor 205 selectively activates and deactivates the corresponding DS ASR engines. Processor 205 de-activates the DS ASR engine associated with the previous topic at a corresponding transition time to the next topic in the communication sequence.

Figure 5:
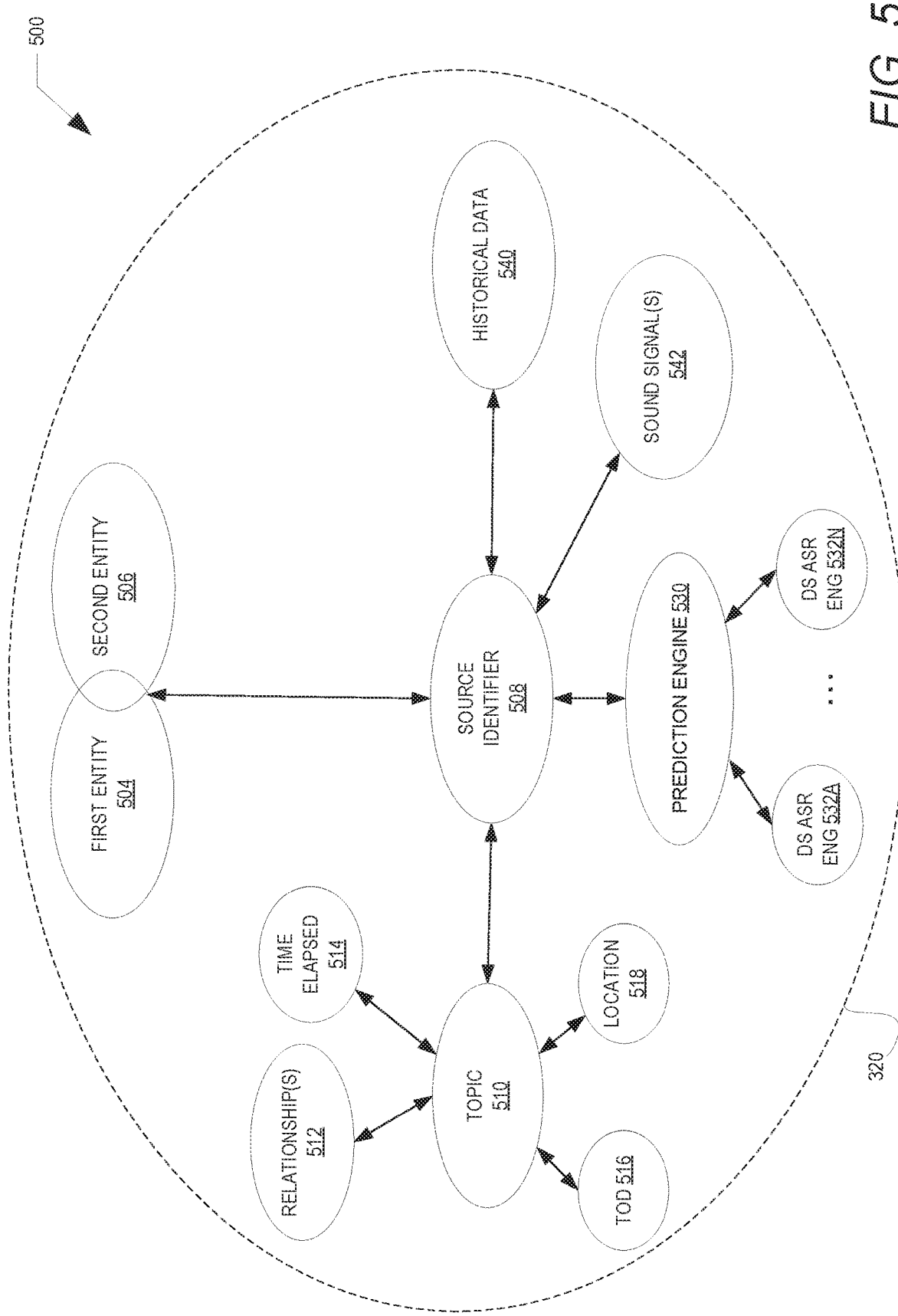
FIG. 5 illustrates an example knowledge graph state diagram for collecting data to support predictive automatic speech recognition engine selection by the communication processing system of FIG. 3, according to one or more embodiments.

FIG. 5 illustrates an example knowledge graph state diagram for collecting data to support predictive ASR selection by the communication processing system of FIG. 3, according to one or more embodiments. Knowledge graph 500 includes, but is no limited to including, first entity 504 and second entity 506. For each corresponding first entity 504 and second entity 506, processor 205 generates and links source ID 508 to the pairing of first entity 504 and second entity 506. Knowledge graph 500 associates source ID 508 to predicted topic 510, predicted by prediction engine 530, and to historical data 540, and sound signals 542. Sound signals 542 can include, for instance, background noise, acoustic characteristics, and audio signals for identifying distinct activities. Topic 510 can link to a number of contexts associated with the communication between first entity 504 and second entity 506, such as entity relationship 512, time elapsed 514, time of day 516, and location 518. Prediction engine 530 can access a plurality of DS ASR engines, for example DS ASR engines 532A-N. Linking source ID to background noise/acoustic characteristics 542 enables processor 205 to identify when a subsequent sound signal is approximately equivalent to a sound signal detected during the communication. In one embodiment, the subsequent sound signal is detected at substantially a same time of a different day during the communication between the first entity and second entity.

Within knowledge graph 500, processor 205 identifies a pattern of sound signals in response to linking one or more sound signals that are approximately equivalent. In response to detecting sound signal(s) 542 just prior to or during a subsequent communication, processor 205 predicts the topic of the subsequent communication and the corresponding DS ASR engine 532A to activate, in part based on the sound signal. Processor 205 activates DS ASR engine 532A for the subsequent communication based, in part, on the identified pattern of sound signals linked to source ID 508 within knowledge graph 500.

In one embodiment, processor 205 predicts the topic of the communication in part based on at least one other context (in addition to an elapsed time since a previous communication) from among a plurality of other contexts that are associated with topic 510 and that can influence which topic from among multiple possible topics is predicted by a prediction algorithm of the electronic device. In one example, the context corresponding to location 518 is also utilized to predict the topic of communication. Location 518 can include a location at which the communication takes place, the location being at least one of (i) a location of the electronic device, and (ii) a location of one or both of the first entity and the second entity. In another example, one or more contexts corresponding to relationship 512 is also utilized to predict the topic of communication. In one embodiment, relationship 512 includes identification of a habitual sequence of topics covered in communications between first entity 504 and second entity 506, as well as historical data 540 on how first entity 505 and second entity 506 relate to themes routinely seen in prior communications between the first entity and second entity. In another embodiment, relationship 512 can be a manner in which at least one of the first entity and the second entity communicates about specific domains. Further, in another embodiment, relationship 512 can include identification of one or more characteristics of a relationship between each party to the communication, as well as known acoustic characteristics used by the first entity and second entity during prior communications with each other. Still, in yet another embodiment, the other context can include detection, during the communication between first entity 505 and second entity 506, of sounds (542) commonly associated with specific historical data 540 and other contexts. In another embodiment, the other context can be a context corresponding to time of day 516 and include a time of day of at least one of the communication and the previous communication. The other context corresponding to time of day 516 can also include detection of common background noise(s) heard routinely when the first entity and the second entity are communicating at specific times of day.

Figure 6A:
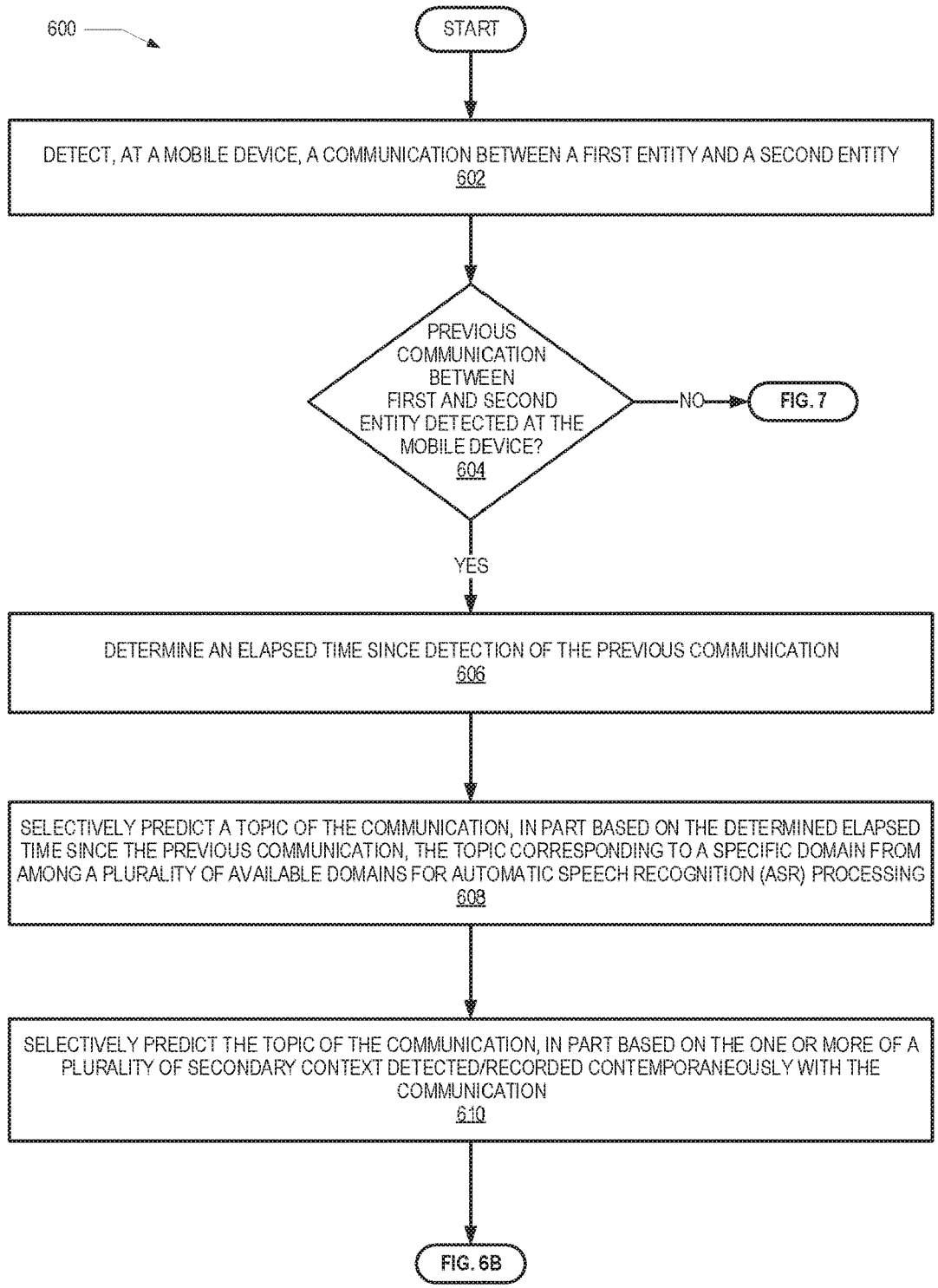
FIG. 6A is a flow chart illustrating a method for selectively predicting a topic of communication between two entities, the prediction based, in part, on an elapsed time since a previous communication between the two entities, in accordance with one or more embodiments.
Figure 6B:
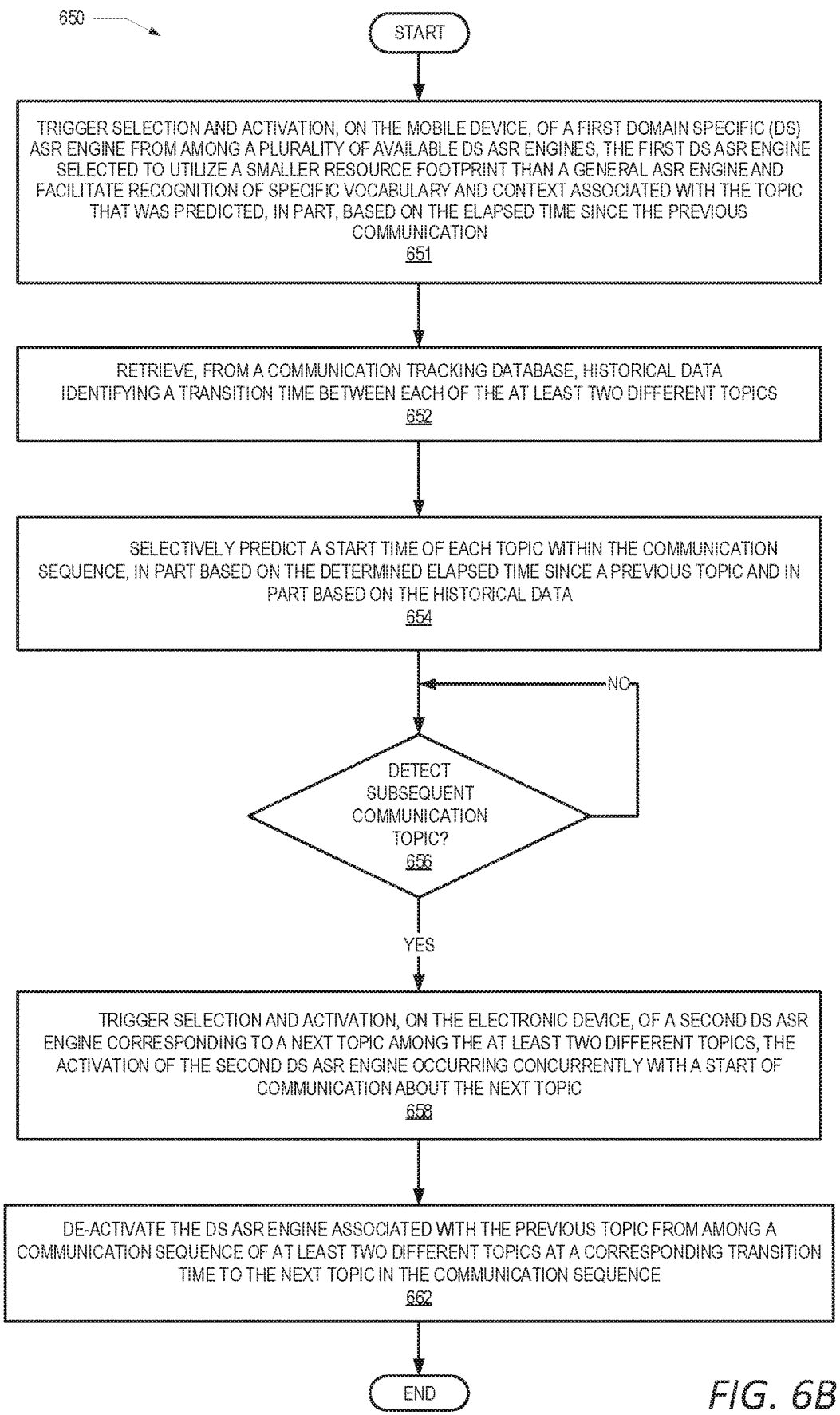
FIG. 6B is a flow chart illustrating a method for selecting and triggering activation of a domain specific automatic speech recognition engine, which is selected based on a prediction of a topic of a communication between two entities, in accordance with one or more embodiments.
Figure 7:
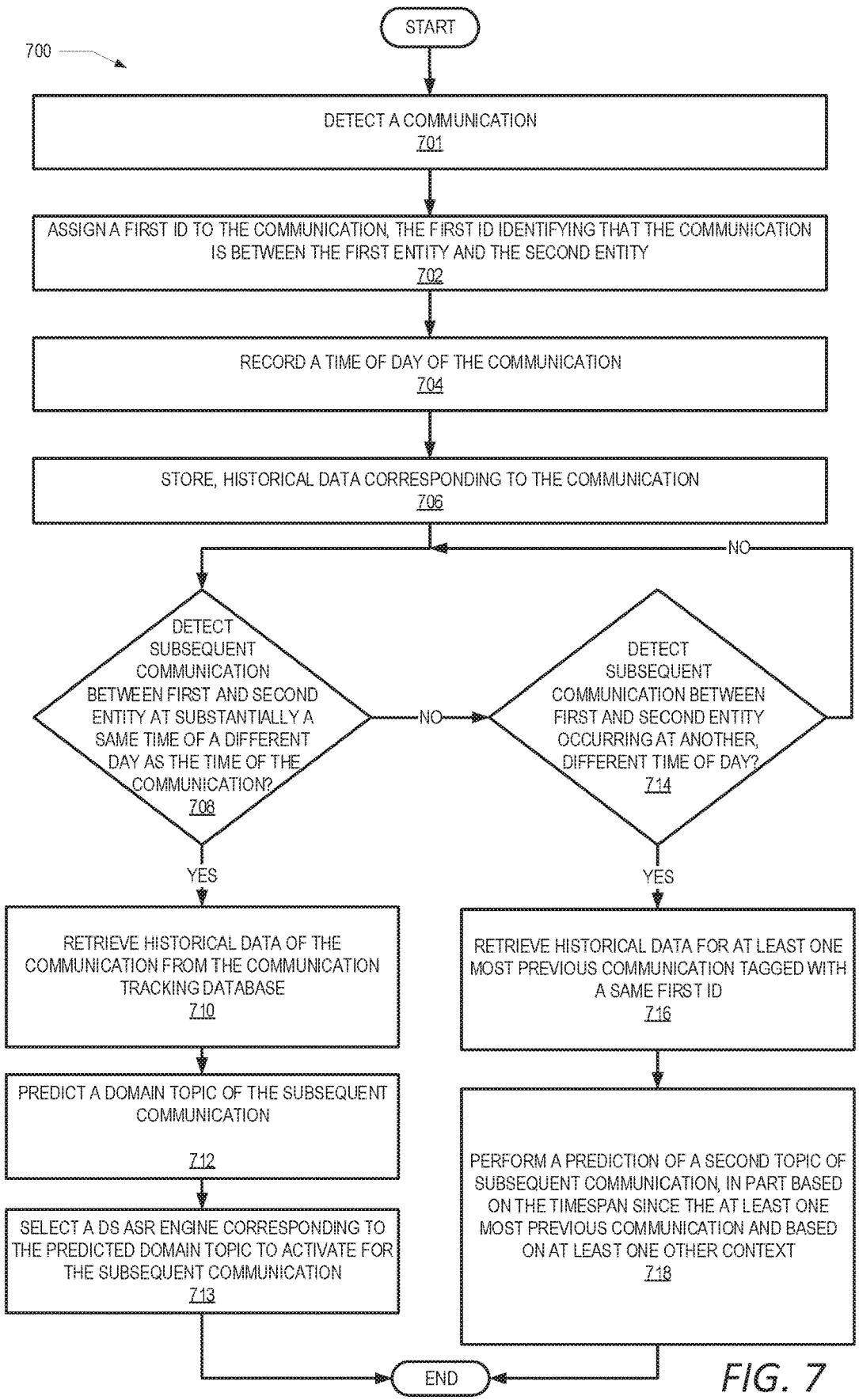
FIG. 7 is a flow chart illustrating a method for predicting a topic of communication based on one or more contexts, including an elapsed time since a previous communication between two entities, in accordance with one or more embodiments.

Referring now to the flow charts of FIGS. 6A, 6B, and 7. In FIG. 6A there is provided a flow chart illustrating a method for selectively predicting a topic of communication between two entities, the prediction based, in part, on an elapsed time since a previous communication between the two entities, in accordance with one or more embodiments. In FIG. 6B there is provided a flow chart illustrating a method for selecting and triggering activation of a domain specific automatic speech recognition engine, which is selected based on a prediction of a topic of a communication between two entities, in accordance with one or more embodiments. In FIG. 7 there is provided a flow chart illustrating a method for predicting a topic of communication based on one or more contexts, including an elapsed time since a previous communication between two entities, in accordance with one or more embodiments. Aspects of the methods are described with reference to the components of FIGS. 1-5. Several of the processes of the methods provided in FIGS. 6A, 6B, and 7 can be implemented by a processor (e.g., processor(s) 105 or processor 205) executing software code of ASRES utility 142 or 242. In the following method processes described in FIGS. 6A, 6B, and 7, processor 105 executes ASRES utility 142 and/or processor 205 executes ASRES utility 242 to perform the steps described herein.

Method 600 commences at the start block, then proceeds to block 602. At block 602, processor 205 detects, at mobile device 200, a communication between a first entity and a second entity. At block 604, processor 205 determines whether there was a previous communication between first and second entity at mobile device 200. In response to there not being a previous communication between the first and second entity at the mobile device, the method proceeds to flow chart 700 of FIG. 7. In response to there being a previous communication between the first and second entity, at block 606, processor 205 determines an elapsed time since detection of the previous communication.

According to one embodiment, method 600 includes the processor (i) determining the elapsed time by identifying a time of day that the communication is detected, (ii) recording, within a communication tracking database (252), the time of day of the communication, (iii) comparing the time of day with a most recent previously-recorded time of day for the previous communication between the first entity and the second entity, and (iv) identifying, from historical data, when the time of day of the communication is proximate to a stored time of day for at least one previous communication between first entity 406 and second entity 408.

Returning to FIG. 6A, at block 608, processor 205 predicts a topic of the communication, in part, based on the determined elapsed time since the previous communication. The topic corresponds to a specific first domain from among a plurality of available domains for ASR processing. As further provided at block 610, the predicting of the topic further includes predicting the topic in part based on at least one other context from among a plurality of other contexts that influence which topic from among multiple possible topics is predicted by the prediction algorithm of the electronic device. With this step of the process, the prediction engine completes the prediction of the topic using at least one secondary context in addition to the elapsed time since the previous communication. In one embodiment, processor 205 predicts the topic of the communication in part based on the time of day of the communication and the historical data. According to one or more embodiments, the secondary contexts include one or more of: a location at which the communication takes place, the location being at least one of (i) a location of the electronic device, and (ii) a location of one or both of the first entity and the second entity; identification of a habitual sequence of topics covered in communications between the first entity and the second entity; a time of day of at least one of the communication and the previous communication; identification of one or more characteristics of a relationship between each party to the communication; known acoustic characteristics used by the first entity and second entity during prior communications with each other; historical data on how the first entity and second entity relate to themes routinely seen in prior communications between the first entity and second entity; a manner in which at least one of the first entity and the second entity communicates about specific domains; detection of common background noise heard routinely when the first entity and the second entity are communicating at specific times of day; and detection, during the communication, of sounds commonly associated with specific historical contexts. After completing the prediction of the topic, based in part on the elapsed time and in part on one or more of the other contexts, method 600 then proceeds to FIG. 6B. It is appreciated that the processes presented in blocks 608 and 610 can be combined into a single prediction process by which prediction engine 116/216 performs a single prediction of the topic of the communication in part based on the elapsed time and in part based on any one or more of the plurality of the secondary contexts, including historical data. The processes can thus be combined into a single process block in method 600, in one alternate embodiment.

At FIG. 6B, the communication and previous communication occur within a communication sequence covering at least two different topics that typically occur between the first entity and the second entity beginning at a specific time of day. Each different topic has an associated DS ASR engine associated therewith. Beginning at block 651, processor 205 triggers selection and activation, on mobile device 200, of a first DS ASR engine (corresponding to the first domain) from among a plurality of available DS ASR engines. Processor 205 selects the first DS ASR engine to utilize a smaller resource footprint for ASR processing than a general ASR engine. Further, the selected first DS ASR engine facilitates recognition of specific vocabulary and context associated with the topic that was predicted. First DS ASR engine is also selected, in part, based on the elapsed time since the previous communication.

At block 652, processor 205 retrieves, from CTDB 252, historical data identifying a transition time between each of the at least two different topics. Processor 205 predicts a start time of each topic within the communication sequence, at block 654. The start time is in part based on the determined elapsed time since a previous topic and in part based on the historical data. At block 656, processor 206 determines whether a subsequent communication is detected. In response to a subsequent communication not being detected, the process waits at block 656 for a subsequent communication. In response to the subsequent communication being detected the method proceeds to block 658. At block 658, processor 205 triggers selection and activation, on the mobile device (200), of a second DS ASR engine corresponding to a next topic of the subsequent communication, where the communication and subsequent communication involve the at least two different topics. The activation of the second DS ASR engine occurs concurrently with a start of communication about the next topic. At block 662, processor 205 de-activates the DS ASR engine associated with the previous topic from among a communication sequence of at least two different topics at a corresponding transition time to the next topic in the communication sequence. The method 600 concludes at the end block.

Referring now to FIG. 7, method 700 commences at the start block, then proceeds to block 701. At block 701, processor 205 detects a communication, which processor 205 determines to be a first tracked/recorded communication between the two communicating entities. Processor 205 assigns a first ID to the communication between the first and the second entities, at block 702, the first ID identifying that the communication is between the first entity and the second entity. Processor 205 records the time of day of the communication at block 704. At block 706, processor 205 stores historical data corresponding to the communication to a communication tracking database. The historical data includes, but is not limited to the first ID, the time of day, and other detected or recorded environmental contexts temporally associated with the communication. At decision block 708, processor 205 determines if a subsequent communication is detected between the first and second entity at substantially a same time of a different day (e.g., the next day or the same day of the next week) as the time of the communication. In response to a subsequent communication being detected between the first and second entity at substantially a same time of a different day as the time of the communication, processor 205 retrieves the historical data from the communication tracking database, at block 710. At block 712, processor 205 predicts a domain topic of the subsequent communication and, at block 713, processor 205 selects a DS ASR engine corresponding to the predicted domain topic to activate for the subsequent communication. The prediction of a topic and selection and activation of a specific ASR engine is in part based on the time of day of the subsequent communication, historical data of the communication, and recorded metrics related to an accuracy of prediction of the first topic and activation of an associated first DS ASR engine to perform speech recognition on the vocabulary utilized during the communication and natural language speech characteristics of the two entities.

In response to a subsequent communication not being detected between the first and second entity at substantially a same time of a different day as the time of the communication, method 700 transitions to block 714. At decision block 714, processor 205 determines if a subsequent communication is detected between the first and second entity at another, different time of day. In response to not detecting a subsequent communication between the first and second entity occurring at another, different time of day, the method returns to block 706. In response to detecting a subsequent communication between the first and second entity at another, different time of day, the method continues to block 716. At block 716, processor 205 retrieves historical data for at least one most previous communication tagged with a same first ID. At block 718, processor 205 performs a prediction of a second topic of the subsequent communication, in part based on the elapsed time since the at least one most previous communication and based on at least one other context. The process ends at block 718.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   detecting, at an electronic device, a communication between a first entity and a second entity;
   identifying whether a previous communication between the first entity and the second entity has been detected at the electronic device;
   in response to identifying that the previous communication between the first entity and the second entity has been detected at the electronic device:
      determining an elapsed time since detection of the previous communication;
      predicting a topic of the communication, in part based on the determined elapsed time since the previous communication, the topic corresponding to a specific domain from among a plurality of available domains for automatic speech recognition (ASR) processing; and
      triggering selection and activation, on the electronic device, of a first domain specific (DS) ASR engine from among a plurality of available DS ASR engines, the first DS ASR engine selected to utilize a smaller resource footprint than a general ASR engine and facilitate recognition of specific vocabulary and context associated with the topic that was predicted, in part, based on the elapsed time since the previous communication.

2. The method of claim 1, wherein;
determining the elapsed time comprises:
   identifying a time of day that the communication is detected; and
   recording, within a communication tracking database, the time of day of the communication;
   comparing the time of day with a most recent previously-recorded time of day for the previous communication between the first entity and the second entity; and
   identifying, from historical data, when the time of day of the communication is proximate to a stored time of day for at least one previous communication between the first entity and second entity; and
   predicting the topic of the communication comprises predicting the topic in part based on the time of day of the communication and the historical data.

3. The method of claim 1, wherein the predicting the topic of the communication comprises predicting the topic in part based on at least one other context from among a plurality of other contexts that influence which topic from among multiple possible topics is predicted by a prediction algorithm of the electronic device, the plurality of other contexts comprising at least one of:
   a location at which the communication takes place, the location being at least one of (i) a location of the electronic device, and (ii) a location of one or both of the first entity and the second entity;
   identification of a habitual sequence of topics covered in communications between the first entity and the second entity;
   a time of day of at least one of the communication and the previous communication;
   identification of one or more characteristics of a relationship between each party to the communication;
   known acoustic characteristics used by the first entity and second entity during prior communications with each other;
   historical data on how the first entity and second entity relate to themes routinely seen in prior communications between the first entity and second entity;
   a manner in which at least one of the first entity and the second entity communicates about specific domains;
   detection of common background noise heard routinely when the first entity and the second entity are communicating at specific times of day; and
   detection, during the communication, of sounds commonly associated with specific historical data and contexts.

4. The method of claim 1, wherein:
the communication and previous communication occur within a communication sequence covering at least two different topics that typically occur between the first entity and the second entity at a specific time of day, each different topic having an associated DS ASR engine associated therewith; and
the method further comprises:
   retrieving, from a communication tracking database, historical data identifying a transition time between each of the at least two different topics;
   predicting a start time of each topic within the communication sequence, in part based on the determined elapsed time since a previous topic and in part based on the historical data;
   triggering selection and activation, on the electronic device, of a second DS ASR engine corresponding to a next topic among the at least two different topics, the activation of the second DS ASR engine occurring concurrently with a start of communication about the next topic; and
   de-activating the DS ASR engine associated with the previous topic from among a communication sequence of at least two different topics at a corresponding transition time to the next topic in the communication sequence.

5. The method of claim 1, further comprising:
in response to not identifying any previous communication between the first entity and the second entity:
   assigning a first identifier (ID) to the communication, the first ID identifying that the communication is between the first entity and the second entity;
   recording a time of day of the communication; and
   storing, historical data corresponding to the communication, the historical data comprising an identification of the first entity and second entity, the time of the communication, elapsed time since the previous communication, the predicted topic, and the first DS ASR engine, the historical data tagged with the first ID and stored within a communication tracking database.

6. The method of claim 5, further comprising:
in response to detecting a subsequent communication between the first entity and the second entity occurring at another, different time of day:
   retrieving the historical data for at least one most previous communication tagged with a same first ID;
   performing a prediction of a second topic of the subsequent communication, in part based on the elapsed time since the at least one most previous communication and based on at least one other context; and
   updating the communication tracking database to include second historical data associated with the subsequent communication occurring at the other time of day, the second historical data comprising a timestamp of the other, different time of day and detected metrics related to the prediction of the second topic.

7. The method of claim 5, further comprising:
in response to detecting the subsequent communication between the first entity and the second entity at substantially a same time of a different day as the time of the communication:
   retrieving historical data of the communication from the communication tracking database; and
   predicting the topic of, and a corresponding DS ASR engine to activate for, the subsequent communication, in part based on the time of day of the subsequent communication, the historical data of the communication, and metrics related to an accuracy of the prediction of the first topic and activation of an associated first DS ASR engine.

8. The method of claim 5, further comprising:
generating a knowledge graph, the knowledge graph comprising information for associating the topic, time of day, relationship, acoustic characteristics, historical data, and background noise, the background noise stored as an audio signal that is associated with the communication between the first entity and second entity, wherein the audio signal is a data representation of sound detected in at least a portion of the communication;

identifying when a subsequent audio signal that is approximately equivalent to the audio signal is detected at substantially a same time of a different day during the communication between the first entity and second entity;

linking the audio signal to the first ID and storing the audio signal in association with the first ID;

identifying a pattern of audio signals in response to linking one or more audio signals that are approximately equivalent; and in response to detecting the audio signal in the subsequent communication, predicting the topic of, and corresponding DS ASR engine to activate for the subsequent communication based, in part, on the identified pattern of audio signals.

9. The method of claim 1, further comprising:
tracking and collecting historical data associated with a performance of the first DS ASR engine in accurately performing recognition of content of the communication; and updating a prediction engine, based on the collected historical data, to more accurately trigger future predictions of which topic a future communicate relates to and an associated DS ASR engine to activate, based, in part on an elapsed time since a prior communication between the first entity and the second entity and the collected historical data.

10. A data processing device comprising:
a communication receiving device that detects communication;
a storage device; and
a processor that is communicatively coupled to the communication receiving device and the storage device, the processor executing an automatic speech recognition engine prediction utility, which configures the data processing device to:
detect, at an electronic device, a communication between a first entity and a second entity;
identify whether a previous communication between the first entity and the second entity has been detected at the electronic device;
in response to identifying that the previous communication between the first entity and the second entity has been detected at the electronic device:
  determine an elapsed time since detection of the previous communication;
  predict a topic of the communication, in part based on the determined elapsed time since the previous communication, the topic corresponding to a specific domain from among a plurality of available domains for automatic speech recognition (ASR) processing; and
  trigger selection and activation, on the electronic device, of a first domain specific (DS) ASR engine from among a plurality of available DS ASR engines, the first DS ASR engine selected to utilize a smaller resource footprint than a general ASR engine and facilitate recognition of specific vocabulary and context associated with the topic that was predicted, in part, based on the elapsed time since the previous communication.

11. The data processing device of claim 10, wherein the automatic speech recognition engine prediction utility further configures the processor to:

determine the elapsed time, wherein the automatic speech recognition engine prediction utility further configures the processor to:
  identify a time of day that the communication is detected; and
  record, within a communication tracking database, the time of day of the communication;
  compare the time of day with a most recent previously-recorded time of day for the previous communication between the first entity and the second entity;
  identify, from historical data, when the time of day of the communication is proximate to a stored time of day for at least one previous communication between the first entity and second entity; and
  predict the topic of the communication comprises predicting the topic in part based on the time of day of the communication and the historical data.

12. The data processing device of claim 10, wherein the automatic speech recognition engine prediction utility further configures the processor to:
predict the topic of the communication, wherein predicting the topic in part based on at least one other context from among a plurality of other contexts that influence which topic from among multiple possible topics is predicted by a prediction algorithm of the electronic device, the plurality of other contexts comprising at least one of:
  a location at which the communication takes place, the location being at least one of (i) a location of the electronic device, and (ii) a location of one or both of the first entity and the second entity;
  identification of a habitual sequence of topics covered in communications between the first entity and the second entity;
  a time of day of at least one of the communication and the previous communication;
  identification of one or more characteristics of a relationship between each party to the communication;
  known acoustic characteristics used by the first entity and second entity during prior communications with each other;
  historical data on how the first entity and second entity relate to themes routinely seen in prior communications between the first entity and second entity;
  a manner in which at least one of the first entity and the second entity communicates about specific domains;
  detection of common background noise heard routinely when the first entity and the second entity are communicating at specific times of day; and
  detection, during the communication, of sounds commonly associated with specific historical and contexts.

13. The data processing device of claim 10, wherein the automatic speech recognition engine prediction utility further configures the processor to:
  identify the communication and previous communication occur within a communication sequence covering at least two different topics that typically occur between the first entity and the second entity at a specific time of day, each different topic having an associated DS ASR engine associated therewith;
  retrieve, from a communication tracking database, historical data identifying a transition time between each of the at least two different topics;
  predict a start time of each topic within the communication sequence, in part based on the determined elapsed time since a previous topic and in part based on the historical data;

trigger selection and activation, on the electronic device, of a second DS ASR engine corresponding to a next topic among the at least two different topics, the activation of the second DS ASR engine occurring concurrently with a start of communication about the next topic; and de-activate the DS ASR engine associated with the previous topic from among a communication sequence of at least two different topics at a corresponding transition time to the next topic in the communication sequence;

track and collect historical data associated with a performance of the first DS ASR engine in accurately performing recognition of content of the communication; and update a prediction engine, based on the collected historical data, to more accurately trigger future predictions of which topic a future communicate relates to and an associated DS ASR engine to activate, based, in part on an elapsed time since a prior communication between the first entity and the second entity and the collected historical data.

14. The data processing device of claim 10, wherein the automatic speech recognition engine prediction utility further configures the processor to:

in response to not identifying any previous communication between the first entity and the second entity:
assign a first identifier (ID) to the communication, the first ID identifying that the communication is between the first entity and the second entity;
record a time of day of the communication; and
store, historical data corresponding to the communication, the historical data comprising an identification of the first entity and second entity, the time of the communication, elapsed time since the previous communication, the predicted topic, and the first DS ASR engine, the historical data tagged with the first ID and stored within a communication tracking database;
in response to detecting a subsequent communication between the first entity and the second entity occurring at another, different time of day:
retrieve the historical data for at least one most previous communication tagged with a same first ID;
perform a prediction of a second topic of the subsequent communication, in part based on the elapsed time since the at least one most previous communication and based on at least one other context;
update the communication tracking database to include second historical data associated with the subsequent communication occurring at the other time of day, the second historical data comprising a timestamp of the other, different time of day and detected metrics related to the prediction of the second topic
in response to detecting the subsequent communication between the first entity and the second entity at substantially a same time of a different day as the time of the communication:
retrieve historical data of the communication from the communication tracking database; and
predict the topic of, and a corresponding DS ASR engine to activate for, the subsequent communication, in part based on the time of day of the subsequent communication, the historical data of the communication, and metrics related to an accuracy of the prediction of the first topic and activation of an associated first DS ASR engine.

15. The data processing device of claim 14, wherein the automatic speech recognition engine prediction utility further configures the processor to:

generate a knowledge graph, the knowledge graph comprising information for associating the topic, time of day, relationship, acoustic characteristics, historical data, and background noise, the background noise stored as an audio signal that is associated with the communication between the first entity and second entity, wherein the audio signal is a data representation of sound detected in at least a portion of the communication;

identify when a subsequent audio signal that is approximately equivalent to the audio signal is detected at substantially a same time of a different day during the communication between the first entity and second entity;

link the audio signal to the first ID and storing the audio signal in association with the first ID;

identify a pattern of audio signals in response to linking one or more audio signals that are approximately equivalent; and in response to detecting the audio signal in the subsequent communication, predict the topic of, and corresponding DS ASR engine to activate for the subsequent communication based, in part, on the identified pattern of audio signals.

16. A computer program product comprising:
a computer readable storage device; and
program code on the computer readable storage device that when executed within a processor associated with an electronic device having an audio capturing device and a storage, the program code enables the electronic device to perform functions of:
detecting, at an electronic device, a communication between a first entity and a second entity;
identifying whether a previous communication between the first entity and the second entity has been detected at the electronic device;
in response to identifying that the previous communication between the first entity and the second entity has been detected at the electronic device:
determining an elapsed time since detection of the previous communication;
predicting a topic of the communication, in part based on the determined elapsed time since the previous communication, the topic corresponding to a specific domain from among a plurality of available domains for automatic speech recognition (ASR) processing; and
triggering selection and activation, on the electronic device, of a first domain specific (DS) ASR engine from among a plurality of available DS ASR engines, the first DS ASR engine selected to utilize a smaller resource footprint than a general ASR engine and facilitate recognition of specific vocabulary and context associated with the topic that was predicted, in part, based on the elapsed time since the previous communication.

17. The computer program product of claim 16, wherein the program code further comprises program code that enables the electronic device to provide functionality comprising:

determining the elapsed time, wherein determining the elapsed time comprises:
identifying a time of day that the communication is detected; and recording, within a communication tracking database, the time of day of the communication;
comparing the time of day with a most recent previously-recorded time of day for the previous communication between the first entity and the second entity;
identifying, from historical data, when the time of day of the communication is proximate to a stored time of day for at least one previous communication between the first entity and second entity;
predicting the topic of the communication comprises predicting the topic in part based on the time of day of the communication and the historical data, wherein the predicting the topic of the communication comprises predicting the topic in part based on at least one other context from among a plurality of other contexts that influence which topic from among multiple possible topics is predicted by a prediction algorithm of the electronic device, the plurality of other contexts comprising at least one of:
a location at which the communication takes place, the location being at least one of (i) a location of the electronic device, and (ii) a location of one or both of the first entity and the second entity;
identification of a habitual sequence of topics covered in communications between the first entity and the second entity;
a time of day of at least one of the communication and the previous communication;
identification of one or more characteristics of a relationship between each party to the communication;
known acoustic characteristics used by the first entity and second entity during prior communications with each other;
historical data on how the first entity and second entity relate to themes routinely seen in prior communications between the first entity and second entity;
a manner in which at least one of the first entity and the second entity communicates about specific domains;
detection of common background noise heard routinely when the first entity and the second entity are communicating at specific times of day; and
detection, during the communication, of sounds commonly associated with specific historical and contexts;
tracking and collecting historical data associated with a performance of the first DS ASR engine in accurately performing recognition of content of the communication; and
updating a prediction engine, based on the collected historical data, to more accurately trigger future predictions of which topic a future communicate relates to and an associated DS ASR engine to activate, based, in part on an elapsed time since a prior communication between the first entity and the second entity and the collected historical data.

18. The computer program product of claim 16, wherein the program code further comprises program code that enables the electronic device to provide functionality comprising:
in response to not identifying any previous communication between the first entity and the second entity:
assigning a first identifier (ID) to the communication, the first ID identifying that the communication is between the first entity and the second entity;
recording a time of day of the communication; and
storing, historical data corresponding to the communication, the historical data comprising an identification of the first entity and second entity, the time of the communication, elapsed time since the previous communication, the predicted topic, and the first DS ASR engine, the historical data tagged with the first ID and stored within a communication tracking database;
in response to detecting a subsequent communication between the first entity and the second entity occurring at another, different time of day:
retrieving the historical data for at least one most previous communication tagged with a same first ID;
performing a prediction of a second topic of the subsequent communication, in part based on the elapsed time since the at least one most previous communication and based on at least one other context;
updating the communication tracking database to include second historical data associated with the subsequent communication occurring at the other time of day, the second historical data comprising a timestamp of the other, different time of day and detected metrics related to the prediction of the second topic
in response to detecting the subsequent communication between the first entity and the second entity at substantially a same time of a different day as the time of the communication:
retrieving historical data of the communication from the communication tracking database; and
predicting the topic of, and a corresponding DS ASR engine to activate for, the subsequent communication, in part based on the time of day of the subsequent communication, the historical data of the communication, and metrics related to an accuracy of the prediction of the first topic and activation of an associated first DS ASR engine.

19. The computer program product of claim 18, wherein:
the communication and previous communication occur within a communication sequence covering at least two different topics that typically occur between the first entity and the second entity at a specific time of day, each different topic having an associated DS ASR engine associated therewith; and
the program code further comprises program code that enables the electronic device to provide functionality comprising:
retrieving, from a communication tracking database, historical data identifying a transition time between each of the at least two different topics;
predicting a start time of each topic within the communication sequence, in part based on the determined elapsed time since a previous topic and in part based on the historical data;
triggering selection and activation, on the electronic device, of a second DS ASR engine corresponding to a next topic among the at least two different topics, the activation of the second DS ASR engine occurring concurrently with a start of communication about the next topic; and
de-activating the DS ASR engine associated with the previous topic from among a communication sequence of at least two different topics at a corresponding transition time to the next topic in the communication sequence; and
in response to not identifying any previous communication between the first entity and the second entity, the program code further comprises program code that enables the device to provide functionality comprising:
    assigning a first identifier (ID) to the communication, the first ID identifying that the communication is between the first entity and the second entity;
    recording a time of day of the communication; and
    storing, historical data corresponding to the communication, the historical data comprising an identification of the first entity and second entity, the time of the communication, elapsed time since the previous communication, the predicted topic, and the first DS ASR engine, the historical data tagged with the first ID and stored within a communication tracking database.

20. The computer program product of claim 19, wherein the program code further comprises program code that enables the electronic device to provide functionality comprising:
    generating a knowledge graph, the knowledge graph comprising information for associating the topic, time of day, relationship, acoustic characteristics, historical data, and background noise, the background noise stored as an audio signal that is associated with the communication between the first entity and second entity, wherein the audio signal is a data representation of sound detected in at least a portion of the communication;
identifying when a subsequent audio signal that is approximately equivalent to the audio signal is detected at substantially a same time of a different day during the communication between the first entity and second entity;
linking the audio signal to the first ID and storing the audio signal in association with the first ID;
identifying a pattern of audio signals in response to linking one or more audio signals that are approximately equivalent; and
in response to detecting the audio signal in the subsequent communication, predicting the topic of and corresponding DS ASR engine to activate for the subsequent communication based, in part, on the identified pattern of audio signals.

\* \* \* \* \*